United States Patent [19]
Fleming

[11] Patent Number: 5,255,876
[45] Date of Patent: Oct. 26, 1993

[54] LINEAR LIFT AND COUNTERBALANCE AIRCRAFT PASSENGER DOOR

[75] Inventor: Michael A. Fleming, Bellevue, Wash.
[73] Assignee: The Boeing Company, Seattle, Wash.
[21] Appl. No.: 896,524
[22] Filed: Jun. 8, 1992
[51] Int. Cl.5 .............................................. B64C 1/14
[52] U.S. Cl. ................................... 244/129.5; 16/362; 49/386
[58] Field of Search ............... 244/129.5; 49/386, 255, 49/280; 74/89.1, 89, 89.16; 16/248, 298, 307, 362

[56] References Cited

U.S. PATENT DOCUMENTS

| | | | |
|---|---|---|---|
| 3,346,992 | 10/1967 | Lodge | 49/255 |
| 3,751,995 | 8/1973 | Carlson | 74/20 |
| 3,820,282 | 6/1974 | Kornyiak | 49/255 |
| 3,888,045 | 6/1975 | Piegza | 49/255 |
| 4,447,026 | 5/1984 | Maraghe | 244/129.5 |
| 4,474,348 | 10/1984 | Skotte | 244/129.5 |
| 4,479,623 | 10/1984 | Maraghe et al. | 244/129.5 |
| 4,589,613 | 5/1986 | Opsahl | 244/129.5 |
| 4,833,827 | 5/1989 | Bode et al. | 49/280 |

FOREIGN PATENT DOCUMENTS

| | | | |
|---|---|---|---|
| 2062135 | 7/1972 | Fed. Rep. of Germany | 15/4 |
| 2014231A | 8/1979 | United Kingdom | 15/4 |

Primary Examiner—David A. Bucci
Assistant Examiner—Anne E. Bidwell
Attorney, Agent, or Firm—Conrad O. Gardner; B. A. Donahue

[57] ABSTRACT

Method and apparatus for vertically lifting a main entry door in an aircraft in order to clear stop fittings and open outward. A hollow shaft having a counterbalance spring and piston therein, which shaft is mounted in a hinge arm and is rotated via a drive chain. The shaft functions to rotate the door by means of splines on the shaft. A door attachment fitting is secured to the top of the piston and slides on the splines during vertical movement of the door.

2 Claims, 2 Drawing Sheets

LINEAR LIFT AND COUNTERBALANCE AIRCRAFT PASSENGER DOOR

FIELD OF THE INVENTION

This invention relates to aircraft doors, and more particularly, to a method for vertically lifting a pressurized door in order to clear stop fittings and open outward.

BACKGROUND OF THE INVENTION

A variety of prior art patents showing compound movement door mechanisms include: U.S. Pat. Nos. 3,346,992; 3,751,995; 3,820,282; 3,888,045; 4,447,026; 4,474,348; 4,589,613; 4,833,827; and U.K. 2,014,231; also, German 2,062,135.

In contrast, the advantages of the present door lifting system over other lifting systems are:

The hinge arm can be located further outboard, giving more cabin area for assist space;

The inboard-outboard movement of the hinge arm is reduced, allowing the interior handle to be located closer to the hinge arm and therefore further outboard;

The fore-and-aft motion of the door relative to the cutout is reduced so that scrubbing of the latch rollers and skin gap is minimized;

The counterbalance spring is moved from the door to the hinge so that the door weight is reduced, thus reducing the force required to lift the door;

The overall part count is reduced when the lifting and counterbalancing is combined;

The overall weight is reduced when compared with the lift link and torsion bar counterbalance design;

Assembly of parts can be accomplished;

Simplified door-to-hinge attachment and counterbalance adjustment;

Counterbalance spring is unloaded when door is removed eliminating danger to maintenance personnel.

SUMMARY OF THE INVENTION

This invention describes a method for vertically lifting a main entry door in order to clear stop fittings and open outward. The mechanism comprises a hollow main shaft and a counterbalance spring and spring piston slideably mounted within the shaft. The main shaft is mounted in a hinge arm and is rotated by a door programming chain. The shaft in turn rotates the door via external splines on the shaft. A door attach fitting is attached to the top of the piston and slides on the shaft splined surface at the bottom during door vertical movement.

DETAILED DESCRIPTION OF THE PREFERRED EMBODIMENT

Figure 1:
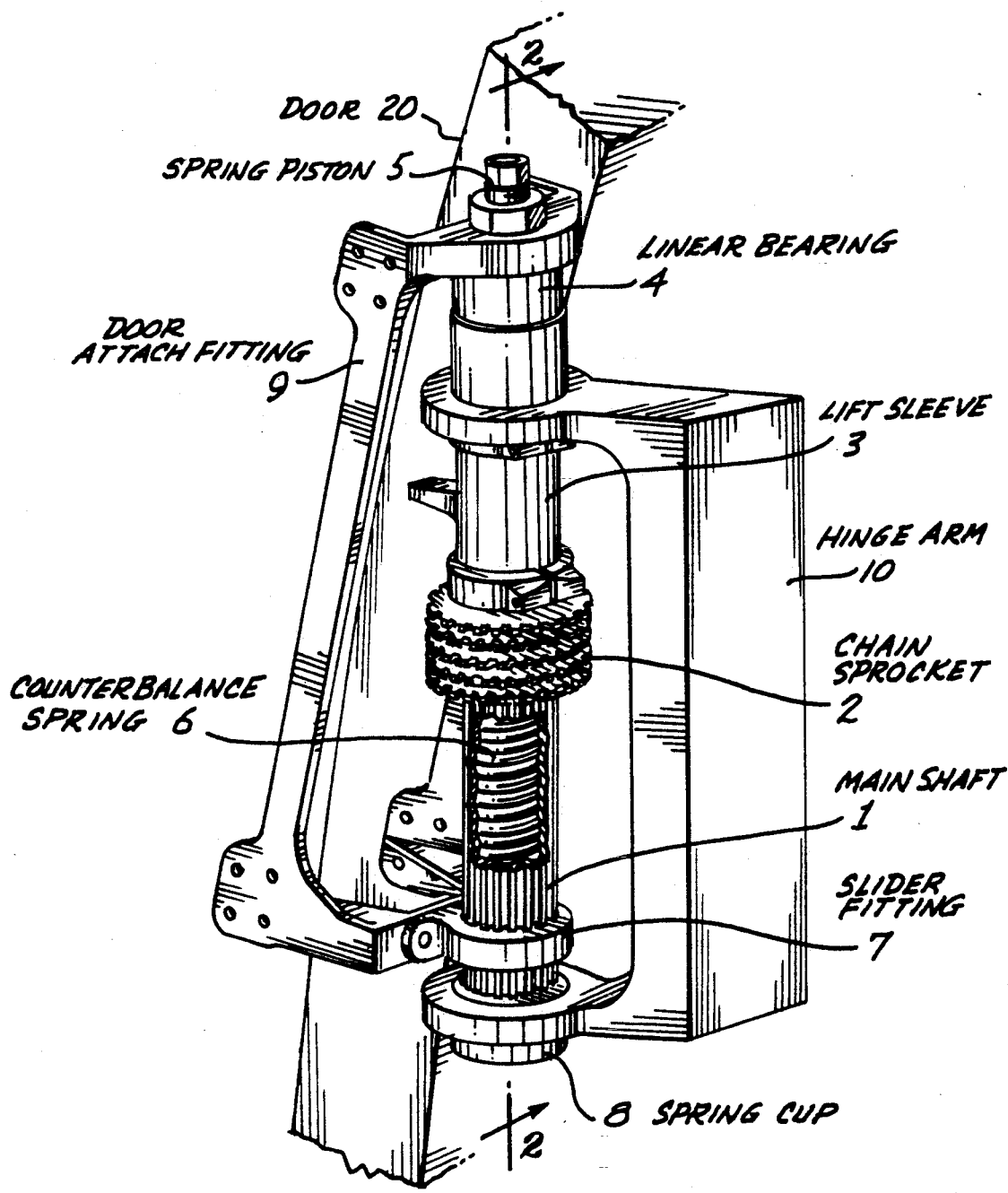
FIG. 1 is a perspective view of the apparatus for vertically lifting and rotating an aircraft door; and, FIG. 2 is a sectional view taken along the lines 2—2 of FIG. 1 of the apparatus for vertically lifting and rotating the aircraft door.
Figure 2:
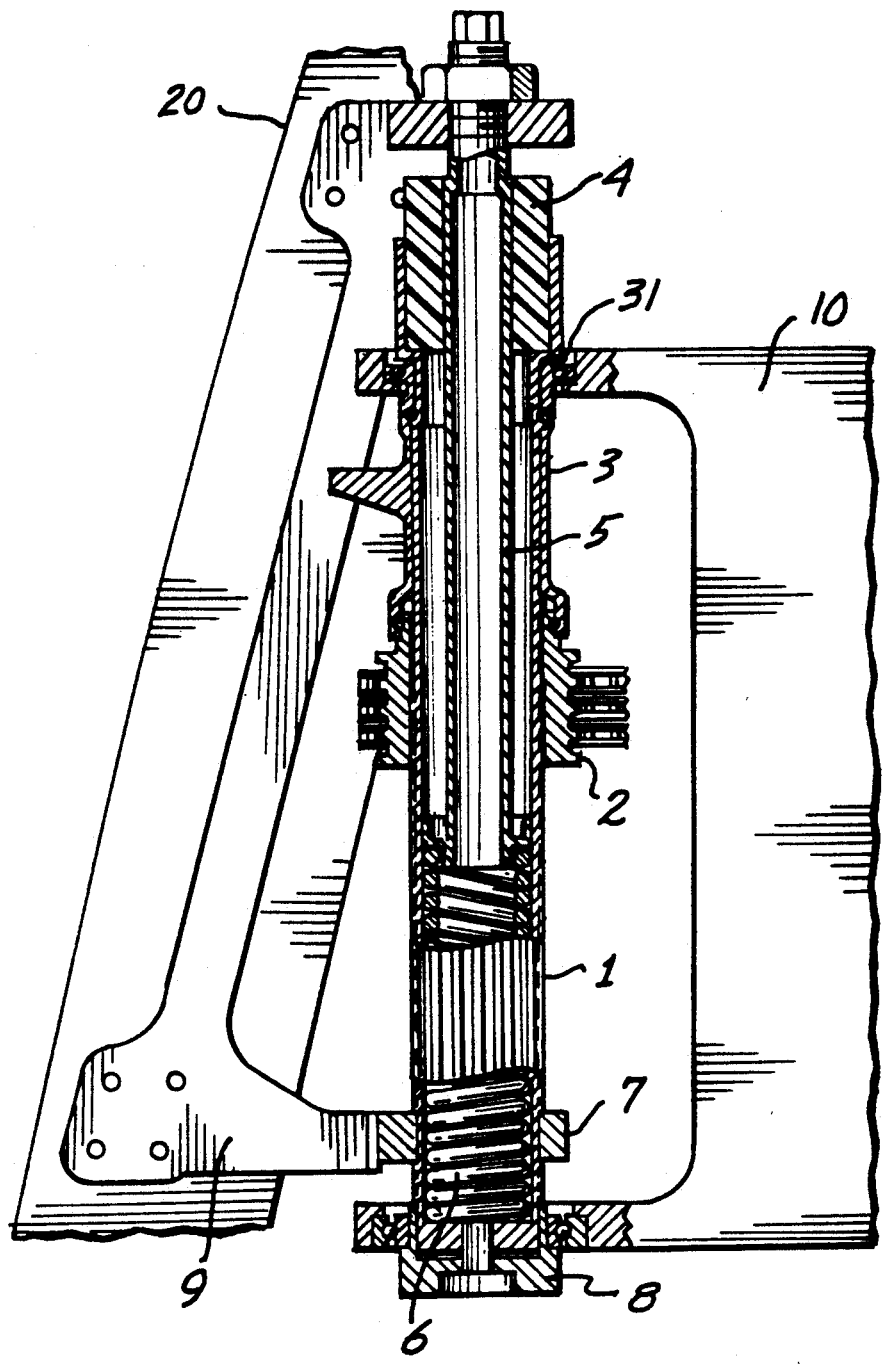

In FIG. 1 and the sectional view are shown an apparatus and method for vertically lifting a pressurized door in order to clear stop fittings and open outward.

The mechanism consists of main shaft 1, chain sprocket 2, lift sleeve 3, linear bearing 4, spring piston 5, counterbalance spring 6, slider fitting 7, spring cup 8, door attach fitting 9, and door hinge arm 10.

Main shaft 1 rotates in door hinge arm via programming chain and chain sprocket 2 to position door 20 relative to the aircraft body 30. Main shaft 1 is restricted from vertical motion due to the trapping of the upper bearing of door hinge arm 10 between main shaft shoulder 31 on top and lift sleeve 3, and is splined to main shaft 1 using the same splines that are used by slider fitting 7. The counterbalance spring force is transferred to door 20 from main shaft 1 through spring piston 5 which is threaded into door attach fitting 9 for spring preload adjustment. Spring piston 5 is guided in a vertical direction by linear bearing 4 mounted in the upper end of main shaft 1, and by the low friction interface between the inner wall of main shaft 1 and lower end of spring piston 5. Slider fitting 7 transfers rotational torque between door 20 and door hinge arm 10. It is splined to match main shaft 1 and moves vertically on shaft 1 with door attach fitting 9. The vertical lift and the rotation of door 20 are separate operations and are not occurring at the same time; therefore, slider fitting 7 is not moving vertically on the splines when it is required to transfer torque to door 20. Lift sleeve 3, because it does not rotate relative to door 20 and does not translate relative to door hinge arm 10, provides a surface on which the lifting of door 20 can be accomplished.

What is claimed is:

1. In combination in a vertically lifting aircraft door adapted to clear stop means and open outwardly:
    a hollow shaft having a counterbalance spring means and piston disposed therein;
    a hinge arm;
    a drive chain;
    said hollow shaft mounted in said hinge arm and rotated by said drive chain;
    said shaft having splines for rotating said vertically lifting door;
    a door attachment fitting;
    said door attachment fitting secured to the top of said piston and capable of sliding on said splines during vertical movement of said door.

2. In a method for vertically lifting an aircraft door, the steps of:
    rotating a main shaft in a door hinge to position the door;
    restricting said main shaft from vertical motion by trapping a upper bearing of a door hinge arm between a main shaft shoulder on top and a retainer sleeve;
    transferring a counterbalance spring force to the door from said main shaft through a spring piston threaded into a door attach fitting for spring preload adjustment;
    guiding said spring piston in a vertical direction by a linear bearing mounted in the upper end of said main shaft and by a low friction interface between the inner wall of said main shaft and lower end of said spring piston;
    providing a slider fitting to match said main shaft for moving vertically on said shaft with said door attach fitting, said slider fitting transferring rotational torque between said door and the door hinge arm.

* * * * *